Nov. 13, 1934.    W. BORCHERT    1,980,746
DEVICE FOR CONNECTION TO TERMINAL ELEMENTS
Filed March 7, 1932
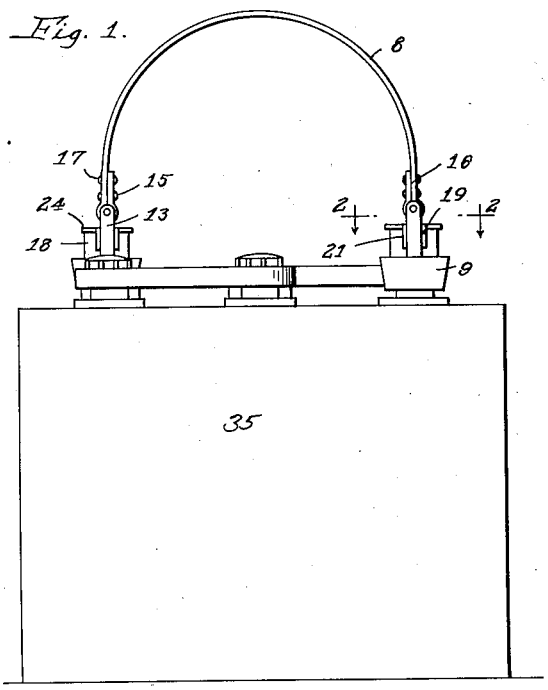
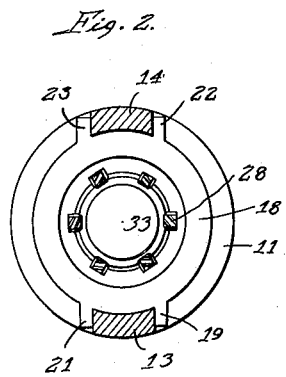
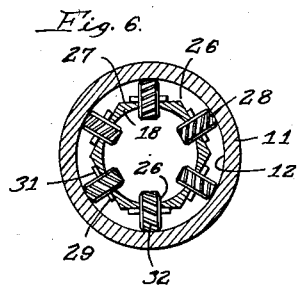
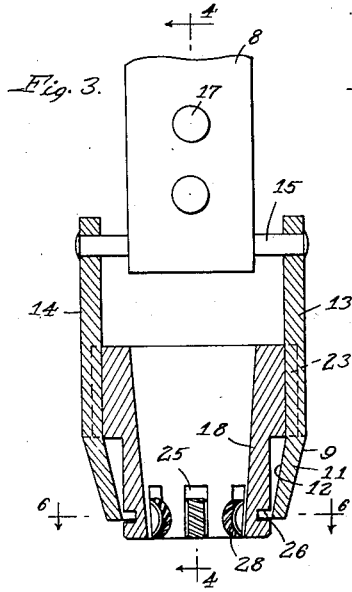
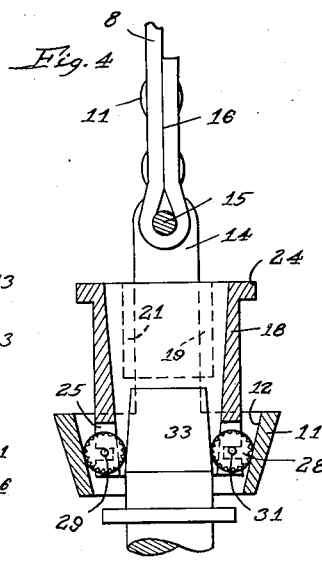
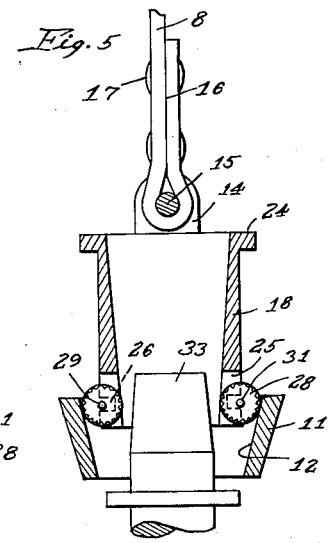
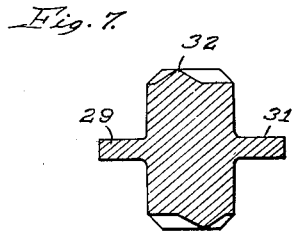
Inventor:
William Borchert
By Wilson, Dowell, McCanna & Rehm
Attys.

Patented Nov. 13, 1934

1,980,746

UNITED STATES PATENT OFFICE 1,980,746

DEVICE FOR CONNECTION TO TERMINAL ELEMENTS

William Borchert, Rockford, Ill.

Application March 7, 1932, Serial No. 597,179

7 Claims. (Cl. 294—114)

This invention relates to devices particularly adapted for connection to terminal elements of articles of various descriptions for handling or manipulation purposes, or for establishing detachable connection with one or more terminal elements. In illustrating my invention I have taken as an example its application to a device for lifting and handling storage batteries. In this instance my invention is of particular advantage in removing such batteries from automobiles and in carrying the batteries from place to place in service stations and the like.

In connection with this example of my invention, it is customary to install storage batteries in automobiles in some out-of-the-way place or position and quite often these installations are such as to render the battery difficult of removal. While handles are normally provided on the battery casing for the purpose of handling the same they are generally of little value, either in removing the battery from the automobile or in carrying the battery because these handles are usually covered by the battery support of the car so that they cannot be readily grasped and because in carrying the battery it must be held away from the body or clothes of the workman to prevent the acid from damaging the clothes. The practice has, therefore, grown up to clamp some exposed part of the battery, such as a cell connecting link with a pair of pinchers and pull on the battery until it is removed from the car. This requires considerable strength because, aside from the energy required to actually lift the battery, considerable energy must be exerted in gripping the pinchers to prevent them from slipping.

Furthermore considerable damage is often done to the batteries through these operations such as breaking the connector links and partitions of the battery. Many times the batteries are dropped because of a poor grip on the heavy battery.

One of the primary aims of this invention is to provide convenient means for rapidly and easily connecting a handling device to a terminal element as, for example, for removing or lifting the battery from an automobile and for carrying the battery from place to place.

Another object of the invention is the provision of improved connector means for connecting a handle to the terminals of a conventional battery or any other terminal element.

Another object is to provide a connector which may be quickly and easily detached from the terminal post of a battery leaving no injurious marks thereon.

A further object of the invention is the provision of a connector which may be lowered over a terminal element, such as the terminal post of a battery, and which when drawn upward will of its own accord grasp the post and provide a lifting connection.

A further object is to provide a device for connection to a terminal element having certain novel functions permitting of quick application and release of the device within the space it occupies. These functions are of particular advantage in establishing quick connection and release between one or more terminal elements, as illustrated in the present case, which deals with a device for connection to the terminals of a storage battery.

Other objects and attendant advantages will become apparent from the following description and the accompanying drawing, in which—

Figure 1 is a side elevation of the invention attached to a storage battery in the lifting position;

Fig. 2 is a section on the line 2—2 of Fig. 1;

Fig. 3 is a vertical section through one of the connectors, showing the cage in its lowermost position;

Fig. 4 is a section on the line 4—4 of Fig. 3 showing the parts in the position that they occupy when the connector is connected to a terminal post;

Fig. 5 is a section similar to Fig. 4 showing the cage in its uppermost position;

Fig. 6 is a section on the line 6—6 of Fig. 3; and

Fig. 7 is a section through the axis of one of the rollers.

The present embodiment of the invention as shown in the drawing consists of a strap designated generally by the numeral 8 formed of cloth, leather, or other flexible non-conducting material having a connector secured at each end for connecting the ends of the strap to the terminal posts of a battery. The handle 8 is of such length as to permit the lifter to be used on various sized batteries with which the operator may come into contact during the course of his work.

While throughout the specification and claims I have referred specifically to a battery lifter it will, of course, be understood that the device in its entirety or the connector may be employed for numerous other purposes where it may become important to make a rapid and positive connection between a rod or bar and some other member, and such uses are also contemplated though not specifically discussed.

Each of the connectors consists of a lifting member designated generally by the numeral 9. This member is in the form of a frusto-cone 11 having downwardly converging inner faces 12. Arms 13 and 14 project upwardly from the body portion 11 of the lifter element at diametrically opposed points. A rod 15 extends between the arms adjacent to the upper end and the ends of the handle 8 are looped there around as shown at 16 to secure the handle to the lifting element. Rivets 17 secure the end of the handle to form the loop. A roller cage 18 of general cylindrical shape is positioned within the lifting element 9 and is provided at opposed sides with projections 19, 21, 22, and 23, which form guideways to receive the arms 13 and 14. The guideways permit the cage to move longitudinally within the lifting element but prevent the same from moving laterally and rotating to any substantial extent. Upward movement of the cage 18 is limited by contact of the upper edge thereof against the rod 15 or the handle 8 as the case may be while the lower limit of this movement is determined by contact of the guideways against the upper edge of the frusto-cone 11. A ledge or rim 24 is formed on the outer surface of the cage 18 at its upper edge to serve as a finger hold for the manual movement of the cage, for a purpose presently to be described. The lower end of the cage 18 is provided with a plurality of longitudinal slots 25 radially spaced around the cage and with a circumferential slot 26 shaped to provide flat bearing surfaces 27 adjacent to each of the longitudinal slots 25. The slots 25 pass completely through the wall of the cage 18 while the circumferential slot 26 passes only a portion of the way through, the inner edge of the slot 26 having the six flat bearing surfaces 27. Rollers or gripping elements 28 of slightly smaller width than slots 25 are positioned in the latter slots and are supported therein by means of hubs 29 and 31 extending from opposite sides of the rollers, into the circumferential slot 26. The slot 26 is substantially larger in all directions than the hubs, thus permitting the rollers to be loosely held within the slots 25. However, the upper and lower surfaces of the slot 26 limit the vertical movement of the rollers and the inner surfaces 27 of the slot 26 limit the inward movement of the rollers. The outward movement of these rollers is limited by contact of the periphery of the rollers against the downwardly converging surface 12 of the connector body or lifting element. The longitudinal movement of the cage 18 is such that at no time can the rollers be radially moved out of the slots 25 between the frusto-cone 11 and the cage 18. Each of the holders is provided with a plurality of ribs or teeth 32 which extend diagonally along the face of the rollers, adjacent rollers having the ribs sloping in opposite directions.

In use, the connectors are lowered over the terminal posts 33 of a battery 34 as shown in Figs. 1 and 5, so that the upper ends of the terminal posts pass through the lower end of each of the frusto-conical body portions 11 and up into the roller cage 18. The cage 18, because of its weight, will drop down between the terminal 33 and the downwardly converging faces 12 until one side of the rollers bears against the terminal post and the other against these faces. This position is shown in Fig. 4 of the drawing. If a lifting force is now applied to the handle 8, which is connected only to the frusto-conical body portion 11, the downwardly converging faces 12 will cause the rollers 28 to be moved inward pressing the ribs on the surface of the rollers into the soft metal of the terminal post. This movement is permitted by the loose fit of the trunnions 29 and 31 in the slot 26 which permits of considerable lateral movement. As the lifting force is continued on the handle 8 the rollers are wedged in between the downwardly projecting faces 12 and the terminal post, the pressure increasing with the lifting force. There is thus established a lifting connection between the battery and the handle 8 which permits the battery to be lifted and carried about. This connection will remain effective so long as a lifting force is applied to the handle. When the operator desires to remove the battery lifter from the battery the lifting element 9 is moved downward by applying a small force through the upper ends of the arms 13 and 14 or by striking them a light blow or otherwise. This moves the frusto-conical body portion 11 out of contact with the rollers 28. The rim 14 is then grasped by the fingers and manually raised upward to a point at which the rollers 28 will no longer be caught between the terminal post and the body portion 11 whereupon the entire connector may be easily removed from the terminal post. As a matter of fact this operation is accomplished by merely grasping the rim 24 and drawing it upward. This will cause the cage 18 to move upward to the limit of its movement whereupon the entire connector will follow continued movement.

The manifold advantages of my improved construction will doubtless have become apparent. The connectors are such as to provide a connection which may be quickly made or broken so that the handle may be very rapidly attached or detached from the battery. It is unnecessary for the operator to exert any clamping force whatever such as that required in the use of pinchers in order to firmly hold the battery. The battery is suspended at two points sufficiently spaced to cause the battery to carry conveniently and level, the connection being made to a portion of the battery of sufficient strength to withstand the force necessary to be applied. The connector is attached to the battery at conveniently accessible points on the battery and is self-attaching so that it is unnecessary for the operator to exercise care in the clamping operation.

The ridges on adjacent rollers are oppositely directed or inclined so that the connector will not become loosened from the post should there be a tendency for the connector to turn thereon when in its operative position, this construction preventing the connector from being screwed off.

Anther important advantage of this construction lies in the fact that each of the connectors is self-contained and that no special means need be employed for attaching the connector.

While I have thus described and illustrated a specific embodiment of my invention I am aware that numerous alterations and changes may be made therein without materially departing from the spirit of the invention and the scope of the appended claims, in which—

I claim:

1. In a device for connection to a terminal element or post, a lifter element shaped to receive a terminal post and having downwardly converging faces opposite said terminal posts, gripping elements between said faces and said terminal post, a cage holding the gripping elements supported on said lifter for longitudinal movement with respect to the terminal post, and means for moving the lifting element independently of said gripping elements to wedge the latter between said terminal post and the converging faces of the lifting element and establish a lifting connection, and means on the cage manually operable for moving both the lifting element and the gripping elements, when the latter have been released, to remove said lifter from said terminal post.

2. In a device for connection to a terminal element or post, a lifting element shaped to receive a terminal post, a plurality of gripping elements between said lifting element and said terminal post, a cage on said lifting element for supporting said gripping elements, said cage extending above the lifting element and being movable under gravity to an operative position and manually movable to an inoperative position, guideways on the periphery of the cage to guide the same on the lifting element, and means to cause said gripping elements to frictionally connect said terminal post and said lifting element when the latter is moved in one direction, and to disconnect the same when moved in the opposite direction.

3. In a device for connection to a terminal element or post, a connector for engaging the terminal post comprising a plurality of laterally movable gripping elements, a lifting element having inclined faces adapted to engage in a wedging action to cause said gripping elements to be wedged between said terminal post and said lifting element when a lifting force is applied to said connector, said connector having upstanding arms for manipulating the connector, a cage for supporting said gripping elements supported on the lifting element for free vertical movement upon and with respect thereto between an operative position in which said gripping elements rest in contact with said terminal post and said lifting element and an inoperative position spaced therefrom, and means on the cage cooperating with said arms for directing and limiting said movement.

4. In a device for connection to the terminal elements or posts of a battery, a pair of quickly detachable connectors joined by a non-conductive handle, said connectors comprised of a body portion adapted to encircle a terminal post of the battery and having an inverted conical surface facing said terminal post, a plurality of ribbed rollers circumferentially spaced around and having one side of each roller touching the terminal post, and the opposite side of each roller resting on the tapered side of the body portion, a cage encircling said post having slots wherein the rollers are confined whereby lifting of the body portion will cause the rollers to be wedged between the body and the terminal post.

5. A device for quick detachable connection to a terminal element comprising a frame shaped to receive the terminal element and having faces converging lengthwise of said element from its terminal end inwardly, gripping elements between said faces and the terminal elements, a cage carrying said gripping elements supported on said frame for free vertical movement to gravitate the gripping elements into operative position between the frame and the terminal element, means for moving said frame independently of said gripping elements to wedge the latter between said terminal element and the converging faces of the frame to establish a lifting or pulling connection, and an annular flange on the cage for manually raising the gripping elements out of operative position and removing the device from the terminal element.

6. A device for quick detachable connection to a terminal element comprising a frame shaped to receive the terminal element and having faces converging lengthwise of said element from its terminal end inwardly, a cage in said frame slidable longitudinally thereon having a plurality of longitudinal slots near its lower end and a lateral slot crossing each of the longitudinal slots, rollers positioned in each of the longitudinal slots having trunnions in said lateral slots, and means for moving said frame independently of said cage to move said rollers laterally and wedge the latter between said terminal element and the converging element of the frame to establish a lifting or pulling connection.

7. A device for quick detachable connection to a terminal element comprising a frame shaped to receive the terminal element and having faces converging lengthwise of said elements from its terminal end inwardly, a cage in said frame slidable longitudinally thereon, a plurality of longitudinal slots at the lower end of said cage, a roller in each of said slots, means to prevent said rollers from passing completely through said slots, and means for moving said frame independently of said cage to move said rollers laterally and wedge the latter between said terminal element and the converging element of the frame to establish a lifting or pulling connection.

WILLIAM BORCHERT.